United States Patent Office 3,215,727
Patented Nov. 2, 1965

3,215,727
ESTERS AND ACIDS USEFUL AS ADDITIVES
AND METHOD OF PREPARATION
Stanley D. Turk and Raymond L. Cobb, Bartlesville,
Okla., assignors to Phillips Petroleum Company, a corporation of Delaware
No Drawing. Filed Apr. 24, 1961, Ser. No. 104,808
8 Claims. (Cl. 260—473)

This invention relates to a novel compound. It also relates to the preparation of said novel compound. Further, it relates to the use of said novel compound to stabilize polyolefins subject to heat degradation. Still further, it relates to a composition of such a stabilizer compound and a polyolefin.

In one of its aspects, the invention relates to a compound having the following structural characteristics:

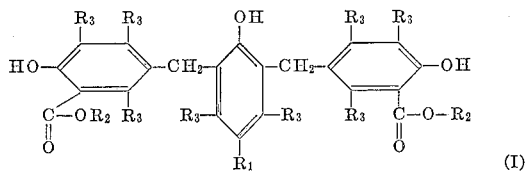

(I)

wherein $R_1$ is an alkyl radical containing from 1 to 10 carbon atoms, $R_2$ is selected from the group consisting of hydrogen; alkyl, aryl, alkaryl, aralkyl, and cycloalkyl containing from 1 to 10 carbon atoms, and $R_3$ is selected from the group consisting of hydrogen and methyl.

The invention also relates to a method of preparing a compound having the structural characteristics of I. Still further, another aspect of the invention relates to the stabilization of a polyolefin which is subject to heat degradation by associating said polyolefin with at least one compound having the structural characteristics of I. Still further, the invention relates to the working of a polyolefin which is subject to degration by heat, for example, as when working or masticating a heat-degradable polyolefin at an elevated temperature, said polyolefin having been stabilized against heat degradation by associating therewith a compound having the structural characteristics of I. Further, in still another aspect of the invention, it relates to the treating at an elevated temperature of a polyolefin which is subject to degradation at such a temperature by stabilizing said polyolefin by adding thereto at least one compound having the structural characteristics of I and then effecting said treating.

Research in the field of olefin polymers has provided a number of new thermoplastic materials such as polyethylene and polypropylene. These materials are widely used in the fabrication of fibers, films and a variety of molded and extruded items. One problem which is encountered in the use of these materials is their thermal degradation which results when they are maintained in environments in which they are subjected to elevated temperatures. Thermal degradation of olefin polymers results in surface cracking and a deterioration of the appearance and physical properties of these materials.

Numerous additives have been proposed and tested for stabilizing olefin polymers against thermal degradation. While some of the stabilizers have been effective to a certain degree, few, if any, have been entirely satisfactory.

We have now discovered that olefin polymers, particularly polypropylene, can be stabilized against thermal degradation by incorporating in said polymers a compound having the structural characteristics of I.

An object of this invention is to provide a novel compound. Another object of this invention is to provide a process for preparing said novel compound. A still further object of this invention is to provide a compound suitable for the stabilization of a polyolefin subject to degradation upon heating the same. Still further, the invention has as an object to provide a method for the working at an elevated temperature of a polyolefin subject to degradation upon heating. A still further object of the invention is to stabilize a polymer. A further object of the invention is to provide polymer compositions which have been stabilized against heat degradation. A further object of the invention is to stabilize a 1-olefin polymer against degradation upon heating. A further object of the invention is to stabilize polyethylene against heat degradation. A still further object of the invention is to stabilize polypropylene against degradation by heat. A still further object of the invention is to stabilize poly-1-butene against heat degradation. A further object still is to stabilize polyisobutylene against thermal degradation.

Other aspects, objects and the several advantages of this invention are apparent from a study of this disclosure and the appended claims.

According to the present invention, a compound suitable as a stabilizer, as herein defined, is prepared by reacting a compound of the formula:

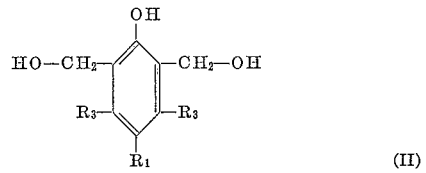

(II)

with a compound of the formula:

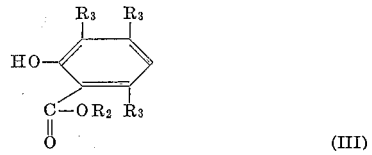

(III)

wherein the R's for each formula are as identified above in Formula I. This reaction is carried out at an elevated temperature, for example, 50 to 150° C., in the presence of a dehydrating agent such as concentrated sulfuric acid or concentrated hydrochloric acid, preferably in the presence of a solvent such as glacial acetic acid. Following the condensation reaction, the product is recovered from the reaction mixture by known methods. Thus, compounds of Formula I wherein $R_2$ is a hydrocarbon radical can be prepared directly or when $R_2$ in the compounds of Formula III is hydrogen, one or both of the carboxyl groups of the product from the condensation reaction can be esterified with the desired alcohol. Furthermore, saponification of ester groups to acid groups can be effected if desired, as can re-esterification of acid groups from saponification reactions.

Also, according to the present invention, there is provided a method wherein a stabilizer as herein defined is incorporated with a polyolefin in a mold or extruder or other device and therein subjected to molding, extrusion, or other working at an elevated temperature.

Still according to the present invention, at least one compound as herein defined is added to or admixed with or otherwise associated or incorporated with a polyolefin to form a composition which is stabilized against thermal degradation.

According to a method of this invention, the stabilizers can be incorporated into an olefin polymer by any suitable means. For example, the stabilizer can be dissolved in a suitable volatile solvent such as acetone, and the resulting solution can be sprayed over pulverized polymer. After application of the stabilizer in this manner, the solvent can be removed by use of an air current, or by heating. Other methods for applying or associating or incorporating the stabilizer with the polymer can be employed. The resulting stabilized polymer can be stored for later use, or it can be used immediately in molding or extrusion procedures for the fabrication of films, fibers, molded articles and the like.

Thus, the stabilizers of this invention can be employed in any olefin polymer in which thermal degradation is a problem. Some examples of olefin polymers in which the stabilizers can be employed are polyethylene, polypropylene, poly-1-butene, polyisobutylene and the like. Generally, the amount of stabilizer which is employed with these polymers will be within the approximate range 0.01 and 1 weight percent based on the polymer. Larger amounts can be used if desired, although, in most cases, such amounts are uneconomical.

Some examples of the compounds of the above general formula which can be employed as stabilizers for olefin polymers according to the process of this invention are:

2,6 - bis(3 - carbo - n - amoxy - 4 - hydroxybenzyl) -p- cresol
2,6 - bis(3 - carbomethoxy - 4 - hydroxy - 2,5,6 - trimethylbenzyl)-4-n-hexylphenol
2 - (3 - carboxy - 4 - hydroxybenzyl) - 6 - (3 - carboethoxy-4-hydroxy-5-methylbenzyl)-4,5-dimethylphenol
2,6 - bis(3 - carbo - n - hexoxy - 4 - hydroxy - 5,6 - dimethylbenzyl)-3,4,5-trimethylphenol
2,6-bis(3-carboxy-4-hydroxybenzyl)-p-cresol
2 - (3 - carbopropoxy - 4 - hydroxybenzyl) - 6 - (3 - carbobutoxy-4-hydroxy-6-methylbenzyl-4-n-butylphenol
2 - (3 - carboxy - 4 - hydroxybenzyl) - 6 - (3 - carbo - n- amoxy-4-hydroxybenzyl)-p-cresol
2,6-bis(3-carbophenoxy-4-hydroxybenzyl)-p-cresol
2 - (3 - carbo - [4 - methylphenoxy] - 4 - hydroxybenzyl)-6-(3-carboxy-4-hydroxy-5-methylbenzyl)-p-cresol
2,6 - bis(3 - carbobenzyloxy - 4 - hydroxybenzyl) - p- cresol
2,6 - bis(3 - [carbo - 3 - phenylpropoxy] - 4 - hydroxybenzyl)-p-cresol
2,6 - bis(3 - carbo - tert - decoxy - 4 - hydroxybenzyl) - 4- isopropylphenol
2,6 - bis(3 - [carbo - 4 - phenylbutoxy] - 4 - hydroxybenzyl)-4-tert-butylphenol
2,6 - bis(3 - carbocyclohexoxy - 4 - hydroxybenzyl) - 4- n-decylphenol
2,6 - bis(3 - carbo [4 - n - butylphenoxy] - 4 - hydroxybenzyl)-4-ethylphenol
2,6 - bis(3 - carbonaphthoxy - 4 - hydroxybenzyl) - 4 - p- cresol
2,6 - bis(3 - [carbo - 4 - cyclohexylbutoxy] - 4 - hydroxybenzyl)-4-n-octylphenol
2,6 - bis(3 - carbocyclodecoxy - 4 - hydroxybenzyl) - 4 - n- nonylphenol.

*Example I*

A run was carried out in which 2-(3-carboxy-4-hydroxybenzyl) - 6 - (3 - carbo - n - amoxy - 4 - hydroxybenzyl)- p-cresol was prepared.

In this run, 175 grams (1.15 moles) of methyl salicylate was dissolved in 175 cc. of glacial acetic acid, after which 98 grams (1 mol) of concentrated sulfuric acid was added with stiring. The clear solution was then heated to 90–95° C., and 37 grams (0.22 mol) of 2,6-dimethylol-p-cresol was added in small portions with stirring at 95–100° C. The first addition turned the solution a bright green color, and with each addition, the color became darker. After about half of the dimethylolcresol had been added, the mixture became turbid. Each addition caused a temperature rise of 2–3° C. The addition was completed in about 1.5 hours, then the mixture was stirred and held at 90–100° C. for 4 hours. The mixture was maintained at room temperature overnight, and finally heated to 90–95° C. for another 2 hours. After the reaction was completed in this manner, the sulfuric acid was neutralized by the slow addition of 280 grams of sodium acetate trihydrate. The majority of the acetic acid was stripped off with stirring under aspirator pressure, and the unreacted methyl salicylate was steam distilled from the residue. Cooling of the residue gave a viscous "tar" that was dissolved in benzene. The benzene solution was washed twice with water, and then extracted several times with 10 percent aqueous sodium hydroxide solution until the color was removed. The basic extracts were combined and acidified with hydrochloric acid, giving a dark colored oil. This oil was then hydrolyzed by refluxing with aqueous sodium hydroxide. Acidification of the hydroxylate gave a brown solid which was dissolved in dioxane. Treatment of the dioxane solution with charcoal and filtering removed part of the color. The dioxane filtrate was then diluted with ether and filtered. Evaporation of the clear yellow dioxane-ether filtrate gave a residue which was dissolved in hot toluene to which a little methanol was added to aid solution. Slow cooling and standing gave a pale yellow sludge, that when filtered and dried became a yellow powder, M.P. 225–235° C. Recrystallization of a small portion of the 11 gram sample above gave a material of M.P. 249–250° C. This material was 2,6-bis(3-carboxy-4-hydroxybenzyl)-p-cresol, empirical formula $C_{23}H_{20}O_7$ (M.W.=408, eq. w.—204). The calculated elemental analysis for this material is carbon—67.6 weight percent and hydrogen—4.9 weight percent. The percentages found by an elemental analysis were carbon—69.8 weight percent and hydrogen—5.0 weight percent. Titration of a sample of the material with standard base gave an equivalent weight of 207.

The acid which was prepared above was dissolved in 50 cc. of n-amyl alcohol, and to this solution was added 5–6 cc. of phosphorus oxychloride. The resulting solution was then heated under reflux for 85–90 hours. After cooling, the mixture was poured into ether, and the resulting solution was washed once with water, three times with saturated sodium bicarbonate solution, once with saturated sodium chloride solution to break an emulsion, and again with water. The solvent was then evaporated and the residue stripped under aspirator pressure on a steam bath for 30 minutes. The dark colored residue was dissolved in hot benzene-heptane mixture. Cooling of this solution gave an amorphous solid, M.P. 135–140° C. The yield was 2.2. grams. After recrystallization once from hot benzene-heptane mixture and once from benzene, 1.9 grams of a product melting at 162–165° C. was obtained. Recrystallization of a small sample three times from benzene gave a material M.P. 166.5–167° C. This material was 2(3-carboxy-4-hydroxybenzyl) - 6 - (3 - carbo-n-amoxy-4-hydroxybenzyl)- p-cresol, empirical formula $C_{28}H_{30}O_7$. The calculated elemental analysis for this material is carbon—70.28 weight percent and hydrogen—6.32 weight percent. The percentages found were carbon—70.0 percent and hydrogen—6.6 percent.

*Example II*

The 2-(3 - carboxy-4-hydroxybenzyl)-6-(3-carbo-n-amoxy-4-hydroxybenzyl)-p-cresol which was prepared in Example I was tested as a thermal stabilizer for polypropylene in the following manner.

In this run, finely ground propropylene was sprayed with a 1.52 weight percent solution o fthe substituted cresol in acetone, using an atomizer. After the polymer was sprayed with the solution, the acetone was evaporated from the wet polymer, and the polymer was compression molded to form a slab ⅛" in thickness. From this slab, 0.5 x 5" strips were cut and tested. In the tests, the strips were hung in a circulating air oven at 150° C. and observed for development of embrittlement. Failure was indicated by breaking of the strips when subjected to 180 degree bend, the time to failure being recorded as a measure of effectiveness of the stabilizer. The amount of polymer which was sprayed with the solution of acetone was such that the polymer after removal of the acetone contained 0.1 weight percent of the substituted cresol stabilizer. The polypropylene containing the stabilizer did not fail until the polymer had been subected to 67 hours in the oven at 150° C. A sample of polypropylene which did not contain any stabilizer failed in less than 20 hours. These results show that the stabilizers of this invention are very effective in stabilizing polyolefin against thermal degradation.

Generally, the compounds included within the formula given herein are prepared by similar procedures, as will be understood by one skilled in the art of possession of this disclosure. Also, the stabilization with the compounds of Formula I hereof is accomplished similarly to that of Example II. The polyolefins to which the compounds of the invention are applicable are well known in the art and generally are included the polymers of 1-olefins, such as are now available commercially.

Reasonable variation and modification are possible within the scope of the foregoing disclosure and the appended claims to the invention, the essence of which is that there have been provided a novel class of compounds suitable for stabilizing a polyolefin against thermal degradation, a method of preparing compounds of said class, a stabilized polymer incorporating at least one of said compounds, and a method of working such a stabilized polymer.

We claim:

1. A compound having the following structural formula:

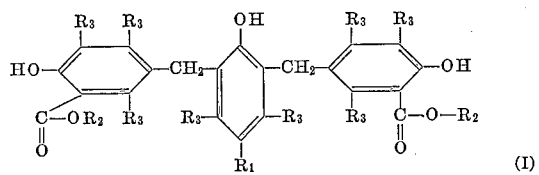

wherein $R_1$ is an alkyl radical containing from 1 to 10 carbon atoms, $R_2$ is selected from the group consisting of hydrogen, alkyl, aryl, alkaryl, aralkyl, and cycloalkyl radicals containing from 1 to 10 carbon atoms, and $R_3$ is selected from the group consisting of hydrogen and methyl.

2. 2,6-bis(3-carboxy-4-hydroxybenzyl)-p-cresol.

3. 2 - (3 - carboxy - 4 - hydroxybenzyl)-6-(3-carbo-n-amoxy-4-hydroxybenzyl)-p-cresol.

4. In a method of preparing a compound having the structural characteristics of Formula I, the step which comprises interreacting a compound having the structural formula:

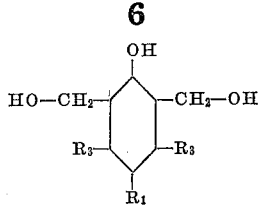

with a compound having the structural formula

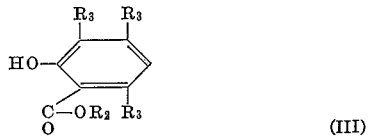

wherein $R_1$ is an alkyl radical containing from 1 to 10 carbon atoms, $R_2$ is selected from the group consisting of hydrogen, alkyl, aryl, alkaryl, aralkyl, and cycloalkyl radicals containing from 1 to 10 carbon atoms; and $R_3$ is selected from the group consisting of hydrogen and methyl in the presence of a dehydrating agent selected from the group consisting of concentrated sulfuric and concentrated hydrochloric acid, heating to cause the reaction to occur, and recovering the product thus obtained.

5. A method according to claim 4 wherein the reaction is effected at a temperature in the approximate range 50–150° C.

6. A method according to claim 5 wherein the reaction is effected in the presence of glacial acetic acid.

7. A method which comprises interreacting methylsalicylate and 2,6-dimethylol-p-cresol in the presence of sulfuric acid at an elevated temperature and recovering the condensed product, 2,6-bis(3-carbomethoxy-4-hydroxybenzyl)-p-cresol, thus obtained.

8. A method according to claim 7 wherein the said condensed product obtained is hydrolyzed and acidified to the corresponding diacid and then said diacid is esterified with amyl alcohol to yield 2-(3-carboxy-4-hydroxybenzyl)-6-(3-carbo-n-amoxy-4-hydroxybenzyl)p-cresol.

References Cited by the Examiner

UNITED STATES PATENTS

| | | | |
|---|---|---|---|
| 2,483,099 | 9/49 | Morris et al. | 260—473 |
| 2,933,520 | 4/60 | Bader | 260—473 |
| 2,964,497 | 12/60 | Kibler et al. | 260—45.85 |
| 2,980,648 | 4/61 | Bell et al. | 260—45.85 |
| 3,035,091 | 5/62 | Wygant | 260—473 |
| 3,116,305 | 12/63 | Morris et al. | 260—474 X |

LORRAINE A. WEINBERGER, *Primary Examiner.*

IRVING MARCUS, DUVAL McCUTCHEN, LEON ZITVER, *Examiners.*